United States Patent [19]
Kling et al.

[11] Patent Number: 5,292,229
[45] Date of Patent: Mar. 8, 1994

[54] ROTOR BEARING ASSEMBLY FOR A WIND POWER ENGINE

[76] Inventors: Alberto Kling, Calle 77A No. 11-92, Bogota, Colombia; Mauricio Kling, Kardinal-Faulhaber-Strasse 5, 8000 Muenchen 2, Fed. Rep. of Germany

[21] Appl. No.: 867,675

[22] Filed: Sep. 2, 1992

[30] Foreign Application Priority Data

Jan. 3, 1990 [DE] Fed. Rep. of Germany ........ 4000092

[51] Int. Cl.$^5$ ............................................. F03B 7/00
[52] U.S. Cl. ............................................. 416/9; 416/10; 416/13
[58] Field of Search .................. 416/9, 10, 11, 12, 13, 416/14, 15, 131, 113

[56] References Cited

U.S. PATENT DOCUMENTS

| | | | |
|---|---|---|---|
| 156,195 | 10/1874 | Wheeler | 416/13 |
| 880,518 | 3/1908 | George | 416/14 |
| 1,042,779 | 10/1912 | Flanigan | 416/12 |
| 2,363,827 | 11/1944 | Albers | 416/9 |
| 4,439,105 | 3/1984 | Hohenemser | 416/13 |
| 4,518,312 | 5/1985 | Jacobs et al. | 416/13 |
| 4,710,100 | 12/1987 | Lang et al. | 416/11 |

FOREIGN PATENT DOCUMENTS

| | | | |
|---|---|---|---|
| 0041488 | 7/1972 | Australia | 416/110 |
| 0083819 | 7/1987 | European Pat. Off. | 416/14 |
| 0907399 | 3/1954 | Fed. Rep. of Germany | 416/10 |

*Primary Examiner*—Edward K. Look
*Assistant Examiner*—Mark Sgantzos
*Attorney, Agent, or Firm*—Nilles & Nilles

[57] ABSTRACT

A rotor bearing assembly for a wind power engine exhibits great stability and strength, and reduces flexural stresses on a mast of a wind power engine.

The bearing body (2) is suspended from and mounted on a horizontal pivot axis (X) and carries a rotor assembly (3) on a short lever arm and an aerodynamic airfoil (5) on a log lever arm (4). In connection with a descending force, an airfoil (5) produces a counter torque about the horizontal pivot axis (X) opposed to the dynamic pressure-dependent torque due to the rotor assembly (3).

23 Claims, 8 Drawing Sheets

ROTOR BEARING ASSEMBLY FOR A WIND POWER ENGINE

BACKGROUND OF THE INVENTION

The present invention relates to a rotor bearing assembly for a wind power engine comprising a rotor assembly and at least one pair of contra-rotating rotors on a multiaxially movable bearing body which includes a positioning device and is mounted on at least one stationary support device, the rotor assembly being arranged at one side of a horizontal pivot axis to face the wind.

Various types of rotor bearing assemblies for wind power engines are known. These are provided with contra-rotating rotors for compensating for the rotor twist and are rotatably mounted on a bearing body.

DE-PS 2 506 160, for instance, discloses a wind power station which is provided with a pair of rotors of opposite twist and whose rotor assembly is rotatable within the bearing body about a rotation axis of the rotors, but is pivotable into the wind together with the bearing body about a horizontal axis extending substantially at right angles relative to the rotation axis of the rotors for adjusting the rotor assembly. Moreover, the rotor assembly is pivotably supported about a vertical axis on the support structure of the wind power station for wind orientation purposes. On account of the size of such rotors, the wind force-dependent stresses (dynamic pressure) which act via the rotor assembly on the bearing and supporting structures thereof, as well as an optimum inclination of the rotor assembly relative to I e wind for achieving a high efficiency of the system, present a main problem in the constructional design of such wind power stations and their command during operation To avoid very high stresses, DE-PS 2 506 160 suggests that 1) the rotor assembly should be given a further degree of freedom which permits a precision movement of the rotor assembly, whereby the rotor positioning is facilitated by exploiting precision forces and that 2) the stresses on the bearing and supporting structure for the active members of the wind power engine should be reduced This, however, leads to a relatively complicated construction of the bearing which, in addition, is not suited for rotor assemblies that are rotatably supported at the bearing body side facing the wind to project therefrom at one side.

As for wind power engines having a rotor assembly which is supported on high support masts via a bearing body which, in turn, is pivotable about a horizontal axis and rotatable about a vertical axis, the flexural stresses on the vertical support mast, as well as the bearing stresses in the area of the bearing body, are considerable in response to the dynamic pressure of the wind. This problem becomes even more acute when the rotor blades of the rotor assembly which are arranged in pairs in contra-rotating fashion are not arranged coaxially, but next to each other with the axes in parallel, or when they are arranged in a twin-type assembly with four rotor blades at one side on the bearing body.

OBJECTS AND SUMMARY OF THE INVENTION

It is therefore the object of the invention to improve a rotor assembly for a wind power engine of the above-mentioned type in such a way that stresses which are due to the dynamic wind pressure and act on a vertical support structure of the wind power engine, in particular high flexural stresses which influence the design of the foundations of the support structure in a special way, are avoided and that the demands made on the ground anchorage of the vertical support structure can be lessened In a preferred development of the rotor bearing assembly of the above-mentioned type, it should also be possible to influence the speed of the rotor assembly and its inclination with respect to the wind direction in an easy way.

Finally, the rotor bearing assembly of the above-mentioned kind should be improved such that it is possible to use a support structure of relatively little mass on the whole.

The above-mentioned object is attained according to the invention in that the bearing body is supported above its center of gravity on the support device to pivot about the horizontal pivot axis, the horizontal pivot axis extends above a horizontal center axis of the rotor assembly, and at the other side of the horizontal pivot axis the bearing body comprises an extended end section or support section with at least one aerodynamic control wing which is pivotably mounted on the end section and designed for the production of a downward force.

Such a rotor bearing assembly advantageously effects a stable balanced mounting of the whole rotor head device of the wind power engine in a pivotable pendulum bearing defined by the horizontal pivot axis formed on the support device. The vertical support structure can first be kept substantially free of those moments that result from the weight of the rotor assembly by correspondingly dimensioning the bearing body which is formed as a two-armed lever and whose axis of rotation coincides with the horizontal pivot axis in the vertical support plane of the rotor bearing assembly of the wind power engine With respect to a bending moment which substantially results from the dynamic pressure of the wind acting on the rotor blades of the rotor assembly and creates a torque about the horizontal pivot axis due to the suspended mounting of the bearing body, the aerodynamic control wing which is provided downstream of the wind side and pivotably supported at a different angle of inclination on the extended end section of the bearing body ensures that in response to the profile geometry and air flow, an "inverse" lifting force, i.e. a downward force, acts on the extended end section or control-wing support section of the bearing body, resulting in a counter torque opposed to the torque generated in response to the dynamic pressure at the rotor side, so that a resultant bending moment which acts on the vertical support structure of the rotor bearing assembly of the wind power engine and stresses, in particular, the foundations of the support structure is virtually offset or at least considerably reduced.

Moreover, the present invention has the advantage that the rotor assembly can be pivoted out of the wind direction through the forced control of the adjustment angle of the aerodynamic control wing in response to the wind force or under dangerous wind conditions so as to control the speed of the rotors, especially when generators are used which are designed for an operation at constant speed. Hence, the speed of the rotors can be limited by controlling the adjustment angle of the control wing.

In a preferred embodiment of the subject matter of the invention, the bearing body comprises a rotor support section at one side of the horizontal pivot axis and a control-wing support section at the other side of the pivot axis, with the distance between the bearing of the rotor assembly and the pivot axis being smaller, preferably in the ratio of 1:2, than the distance between the bearing of the control wing and the pivot axis. The active members of the wind power engine can substantially be supported vertically in their center of gravity owing to a corresponding selection of the lever ratios and in consideration of the torques caused by the weights at both sides of the pivot axis, so that the support structure remains substantially free of bending moments resulting from the construction and weight of the rotor bearing assembly.

Preferably, the control wing has an aerodynamic airfoil profile. The connection of the control wing to the end section of the bearing body is here "inverse", so that the flow of air along the airfoil profile generates a negative lifting force, i.e. a downwards force on the control wing.

In another preferred embodiment of the invention the bottom side of the airfoil profile of the control wing has a curvature which is greater than a curvature on the profiled top side of the control wing.

A pair of control wings are preferably provided at the upper end of the end section or control-wing support section of the bearing body and are pivotably supported there for achieving a force distribution which is as uniform as possible on the bearing body and for increasing the effect on the bearing body.

To move the rotor assembly into the wind, other flow control elements that act as a lateral control, e.g. at least a control flag or a control flap, may be provided in the area of the pivotal mounting of the control wing, i.e. at the downstream end of the end section To influence the wind in a proper way and to ensure an adequate air flow around the control wing which is pivotably supported in the manner of an inverted airfoil on the upper rear portion of the extended end section of the bearing body in order to create a corresponding descending force, the extended end section of the bearing body preferably forms an obliquely upwardly extending control-wing support section with respect to a weight-balanced horizontal position of the bearing body on the vertical support device, with the control wing or wings being pivotably supported on the end section approximately in an imaginary axial extension of an upper peripheral point of the rotor assembly.

Even if the rotor and the control wing are arranged one after the other in the wind direction, an adequate air flow is accomplished in this way for the other lateral control devices, such as control flags, which put the rotor assembly into the wind and are normally provided in conjunction with a downstream end of the bearing body. The same is true of the wind actuation of the control wing itself.

For an easy adjustment of the rotor assembly in the wind direction, the bearing body may also be controlled by a control device so as to pivot about a vertical support axis and the horizontal pivot axis, with the rotors being rotatingly supported within the bearing body at the same time. The bearing body preferably extends within its compact center portion centrically with respect to the vertical support device.

To influence the wind exploitation by the rotor assembly of the wind power engine, in particular in connection with a constant-speed operation of associated generators, the at least one aerodynamic control wing is preferably controllable way by the control device in conjunction with a sensor-type position detecting device with respect to its adjustment angle.

For twist compensating purposes either at least one pair of coaxial contra-rotating rotors is preferably arranged on the bearing body, or two contra-rotating rotors are mounted next to one another on the bearing body. Finally, four contra-rotating rotors may preferably be arranged via a frame structure on the bearing body; each of these rotors may, in turn, consist of two coaxial rotors of opposite twist.

To improve the lateral or tilting stability and to relieve the bearing for rotating the bearing body about the vertical axis, a vertical auxiliary bearing is preferably provided with a cylindrical roller assembly which surrounds the tower or vertical support device of the wind power engine and is preferably supported on a guide ring on the support tower below the main bearing for the rotation of the bearing body about the vertical axis The housing of the auxiliary bearing is preferably connected via a two-armed frame structure to the bearing body.

The tilting resistance can be further increased and the bearing forming the horizontal pivot axis can be further supported by another support bearing provided between the bearing body and the housing of the vertical auxiliary bearing, which preferably consists of a guide-rail/guide roller assembly. At least two guide rails sections of circular arcuate shape that are arranged in parallel at both sides of the vertical support device and also extend along the housing of the vertical auxiliary bearing and are centered with respect to their curvature relative to the horizontal pivot axis of the bearing body are arranged together with the rotor support section and the control-wing support section of the bearing body on the bearing body. Furthermore, guide rollers are provided at both sides of the housing of the vertical auxiliary bearing for engagement with the guide sections.

To protect the rotor bearing assembly against overswinging about the horizontal pivot axis and for performing control operations in connection with the control of the wind attack on the rotors by pivoting the bearing body together with the rotor assembly about the horizontal pivot axis, the bearing body is preferably equipped at both sides of the horizontal pivot axis with first and second tension means for limiting the pivotal movement of the bearing body about the horizontal pivot axis.

In another advantageous embodiment of the invention, the first tension means is disposed between the housing of the vertical auxiliary bearing and a coupling point of the rotor support section of the bearing section, with the coupling point being spaced apart from the pivot axis at the rotor side. The second tension means extends between the housing of the vertical auxiliary bearing and a coupling point of the control-wing support section of the bearing body which is spaced apart from the horizontal pivot axis at the side of the control wing Tensionproof ropes, preferably plastic ropes, which are received on motor-driven reels provided on the housing of the vertical auxiliary bearing and driven by servo motors secured to the housing preferably serve as tension means. Finally, damping means for dampingly limiting the pivotal movement of the bearing body or frame structures connected thereto may preferably be provided on the housing.

BRIEF DESCRIPTION OF THE DRAWINGS

The present invention shall now be explained in more detail with reference to embodiments taken in conjunction with accompanying drawings, in which.

DETAILED DESCRIPTION OF THE PREFERRED EMBODIMENTS

The invention shall now be explained in more detail with reference to embodiments taken in conjunction with accompanying drawings These drawings diagrammatically show the basic structure of various embodiments of a rotor bearing assembly for a wind power engine and details thereof. However, none of the drawings illustrates the electric generator means for converting wind energy into electrical energy.

Figure 1:
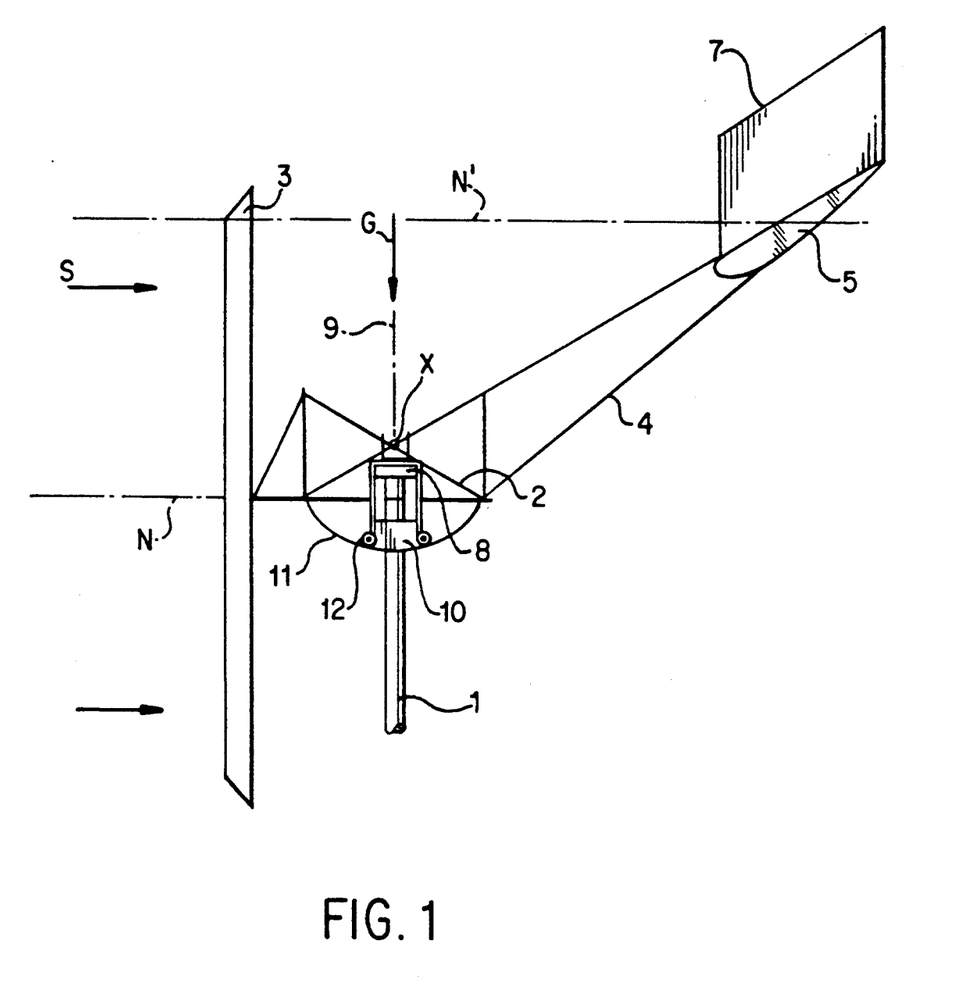
FIG. 1 shows a rotor bearing device of a wind power engine according to a first embodiment of the present invention.
Figure 3:
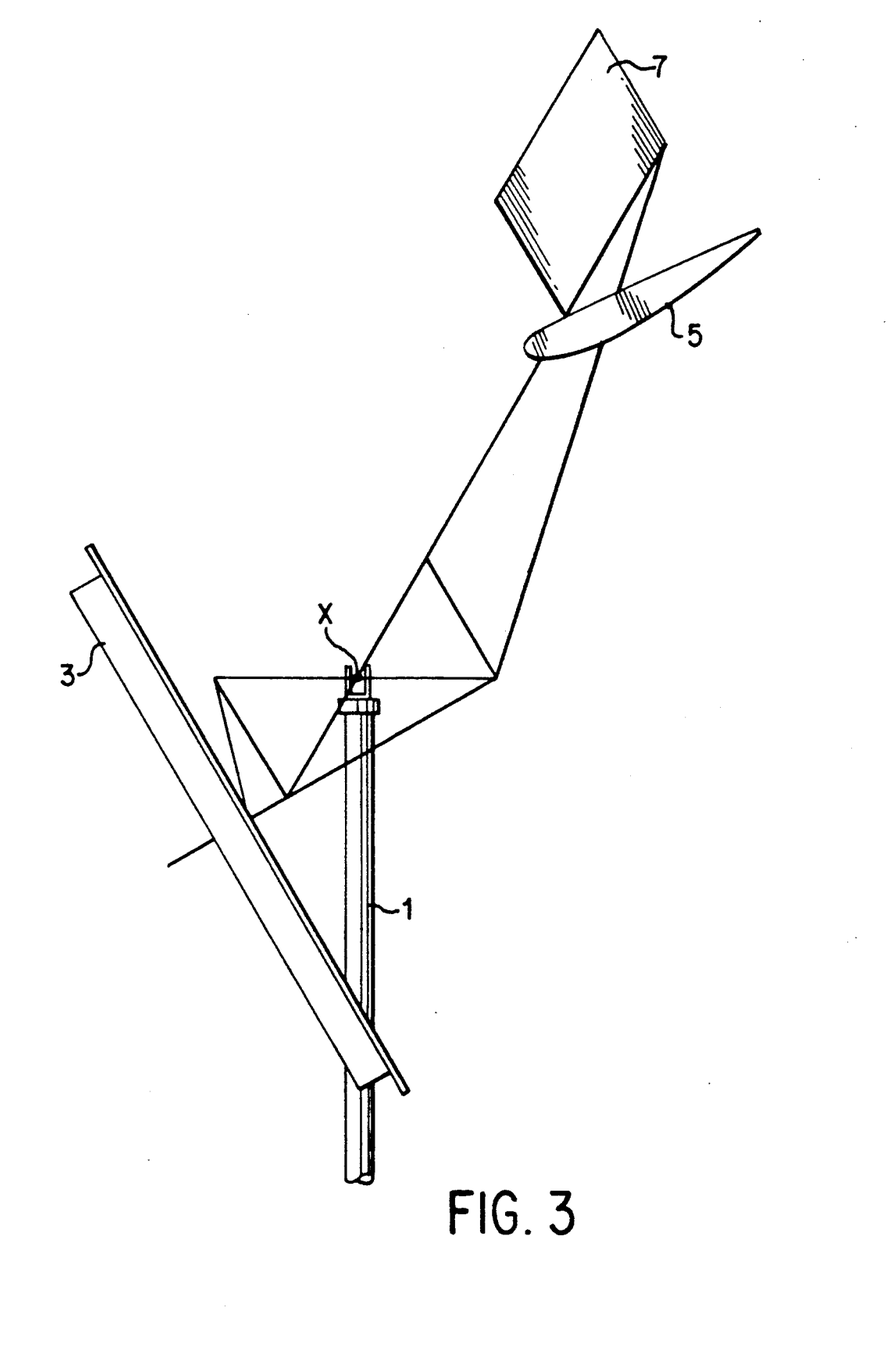
FIG. 3 shows an excursion or control state of the rotor bearing assembly according to FIG. 2.
Figures 4, 5:
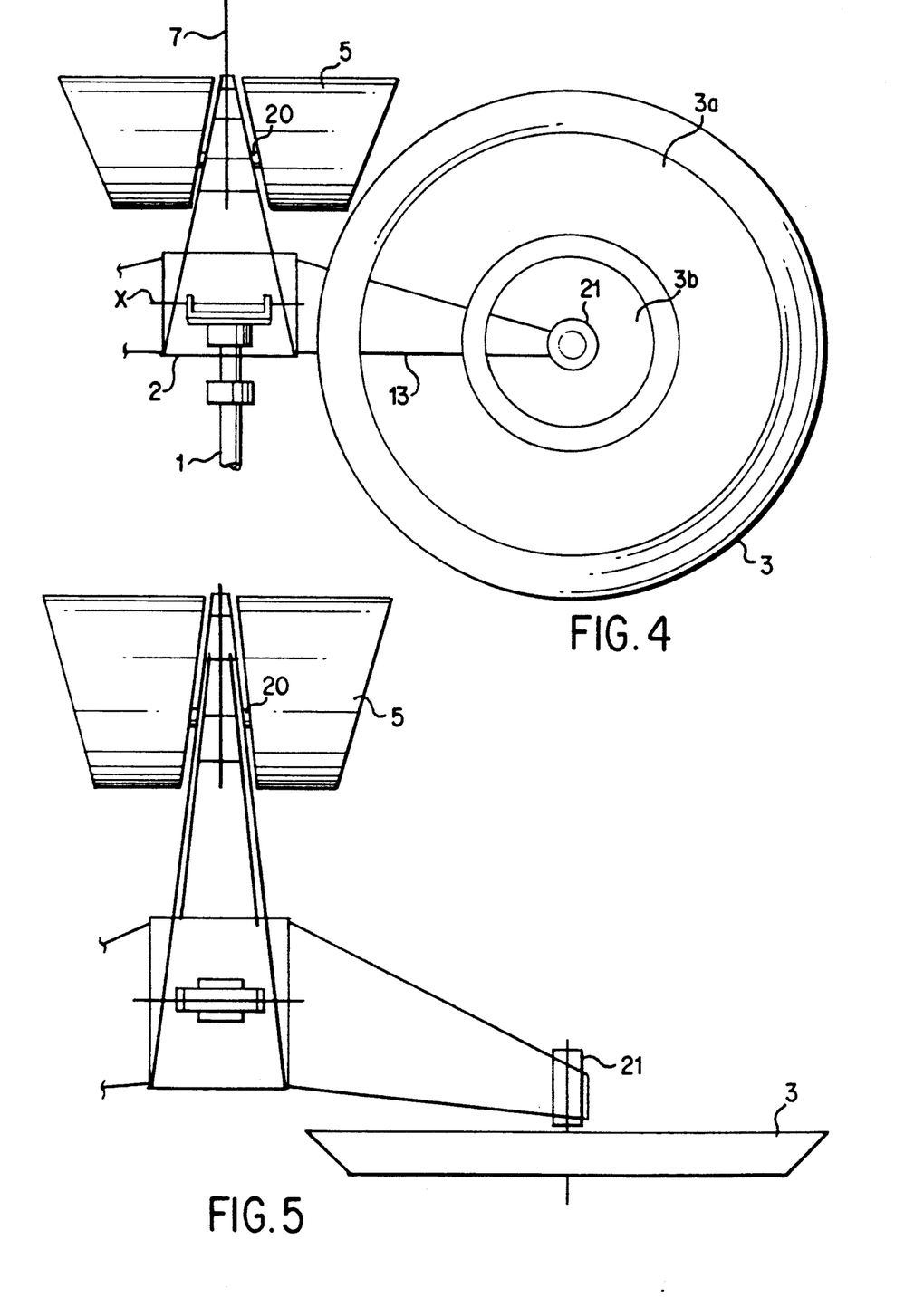
FIG. 4 is a partial front view of a rotor bearing assembly of a wind power engine according to another embodiment of the present invention with two symmetrically arranged rotor pairs.
FIG. 5 is a top view according to FIG. 4.

FIG. 1 diagrammatically shows a rotor bearing assembly of a wind power engine, the latter comprising a vertical support device 1, hereinafter always called tower, and a bearing body 2 which is rotatably or pivotably mounted on the upper end of tower 1 in a multiaxial way. Bearing body 2 is designed as a two-armed lever which is pivotable about a horizontal pivot axis X. A short lever arm (rotor support section) of bearing body 2 (to the left of pivot axis X in FIG. 1) carries via a bearing 21 (FIGS. 4 and 5) a rotor assembly 3 at its end. This rotor assembly consists in the embodiment of FIG. 1, of two rotors of coaxially opposite twist Rotor assembly 3 may also be formed as a twin-type rotor assembly with parallel axes which includes two rotors of opposite twist that are arranged side by side. At its other side, bearing body 2 comprises a longer lever arm (to the right of pivot axis X in FIG. 1) which forms an extended end section 4 (control-wing support section) of the lever arm and at least one aerodynamic control wing 5. This control wing 5 is pivotably arranged in axis 6 (FIG. 6) on end section 4 via a bearing 20 (FIGS. 3 and 4). End section 4 includes a control flag 7 to hold the whole rotor bearing assembly together with control body 2 in the direction of the wind, as outlined in FIG. 1 by arrows to the left of rotor assembly 3.

Bearing body 2 is pivotable about the horizontal pivot axis X centrally and in weight-compensated fashion and centrically mounted on tower 1 and rotatable through a main bearing 8 about a vertical axis 9, so that rotor bearing assembly can follow an alternating wind direction on rotor assembly 3 at any time, i.e. supported by control flag 7.

Furthermore, a vertical auxiliary bearing 10 is provided for the support of the vertical main bearing 8 together with a cylindrical roller assembly 12 and guide paths 11. These members, in turn, form a bearing support for a horizontal support about pivot axis X and shall subsequently be explained in more detail with reference to FIGS. 8 and 9.

Figure 2:
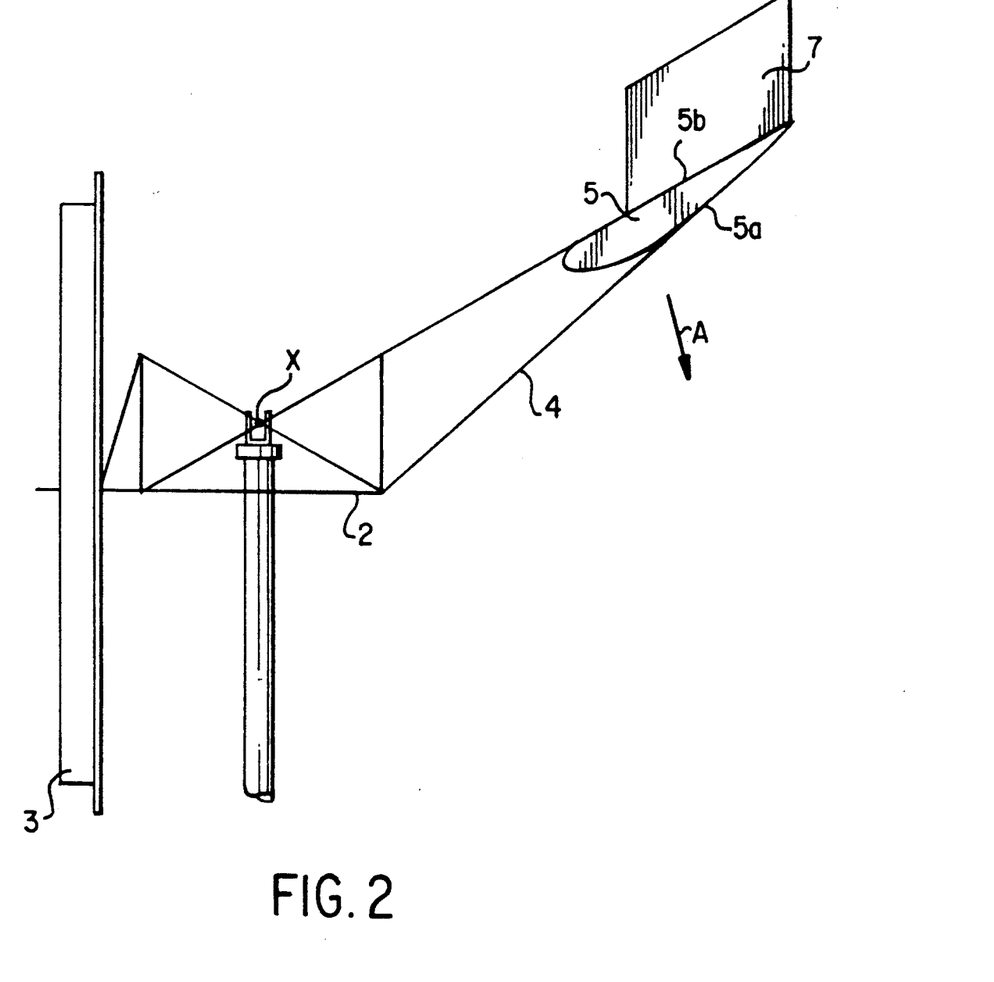
FIG. 2 is a view corresponding to that of FIG. 1, but without an auxiliary bearing assembly.

It shall now be explained, with reference to FIGS. 2 and 3, how the arrangement of control wing 5, which is pivotably mounted on the end section or control-wing support section 4 of bearing body 2, influences the load on tower 1 caused by bending moments due to the dynamic pressure of the wind acting on rotor assembly 3.

FIGS. 2 and 3 diagrammatically show the rotor bearing assembly according to FIG. 1, but without control flag 7. The auxiliary bearing 10, main bearing 8, and guide paths 11 have also been omitted from this drawing for the sake of simplicity.

Control wing 5 has an airfoil profile and is pivotably mounted on end section 4 in an "inverse arrangement". Since control wing 5 is configured such that a bottom side 5a thereof has a greater curvature than a top side 5b thereof, the ascending force created on an airfoil profile in the air flow becomes a descending force due to the inverse arrangement of control wing 5. This descending force is directed downwards at the bottom side and illustrated in FIG. 2 by arrow A.

As becomes already apparent from FIG. 1, the bearing body is mounted in suspended fashion through the horizontal pivot axis X on tower 1 in a stable position of equilibrium in such a way that the horizontal center axis N of rotor assembly 3, with respect to which the opposite rotor twist of the rotor assembly is compensated, extends in vertical direction below and at a distance from the horizontal pivot axis X. To achieve a corresponding flow around control wing 5 and a wind load thereon, the end section 4 of bearing body 2 extends obliquely upwards, so that the pivot bearing of control wing 5 is approximately in an extension N' of the upper peripheral circumferential portion of rotor assembly 3 and, in particular, in connection with a control flag 7 (FIG. 1), an adequate wind load on end section 4 is achieved in the area of control wing 5. The incoming wind produces a dynamic pressure on the rotor blades of rotor assembly 3 on the one hand and has the effect on the other hand that a downward force is created due to the profiled control wing 5 (see arrow A in FIG. 2). This downwardly directed force produces a torque about the horizontal pivot axis X, so that bearing body 2 together with rotor assembly 3 tends to rotate about pivot axis X, i.e. with respect to end section 4, downwardly and forwardly due to the substantially weight-balanced mounting of the whole assembly in the horizontal pivot axis X. By contrast, the dynamic horizontal pressure exerted on rotor assembly 3 (see arrows S in FIG. 1, on the assumption of a substantially horizontal wind impact in FIGS. 1 and 2) effects a counter-rotation of the rotor assembly with bearing body 2 about pivot axis X towards a position as is, e.g., illustrated in FIG. 3. As far as rotor assembly 3 is concerned, this means a downward and rearward pivotal movement about the X axis.

As a result of the arrangement of control wing 5, a compensating counter torque about pivot axis X takes place (in FIG. 1 downwards and to the left) in addition to the dynamic pressure-dependent torque which pivots the rotor assembly about the horizontal pivot axis X downwards and to the right (FIG. 1), so that a resulting bending torque which acts on tower 1, especially on the ground foundations thereof, is reduced or can be offset.

Bearing body 2 is preferably designed with respect to the rotor support section in relation with the control-wing support section and in consideration of the associated mass distribution in such a way that moment stresses on tower 1 due to a weight of the rotor bearing assembly are prevented or at least kept very small.

Although this is not shown in FIGS. 1-3, other wind adjusting elements, such as flaps, may of course be provided in the area of end section 4 of bearing body 2, either in addition to or instead of a control flag 7 (FIG. 1).

FIG. 3 shows a pivotal position of bearing body 2 with rotor assembly 3 and control wing 5 in dependence upon the dynamic pressure of the wind Such a position could also be adjusted arbitrarily by control means (not shown) for preventing dangerous vibrations in case of excessive wind speeds and for pivoting rotor assembly 3 partly out of the wind, or for adjusting a constant-speed operation of rotor assembly 3, for instance, when generators which operate at constant speed are used together with the rotor assembly In addition to means (not shown) for pivoting the whole rotor bearing assembly about the horizontal pivot axis X, a control device may also be provided for the forced control of the adjustment angle of control flap 5 in connection with the control of the rotor speed so as to adjust an angle of inclination enclosed by the rotor bearing assembly with bearing body 2 about the horizontal pivot axis X by adjusting the magnitude of the descending force A, in particular, to regulate the speed of rotor assembly 3. The ratio of the lever arms of the bearing body with respect to pivot axis X between control-wing support section and rotor support section may be 2:1.

Figure 7:
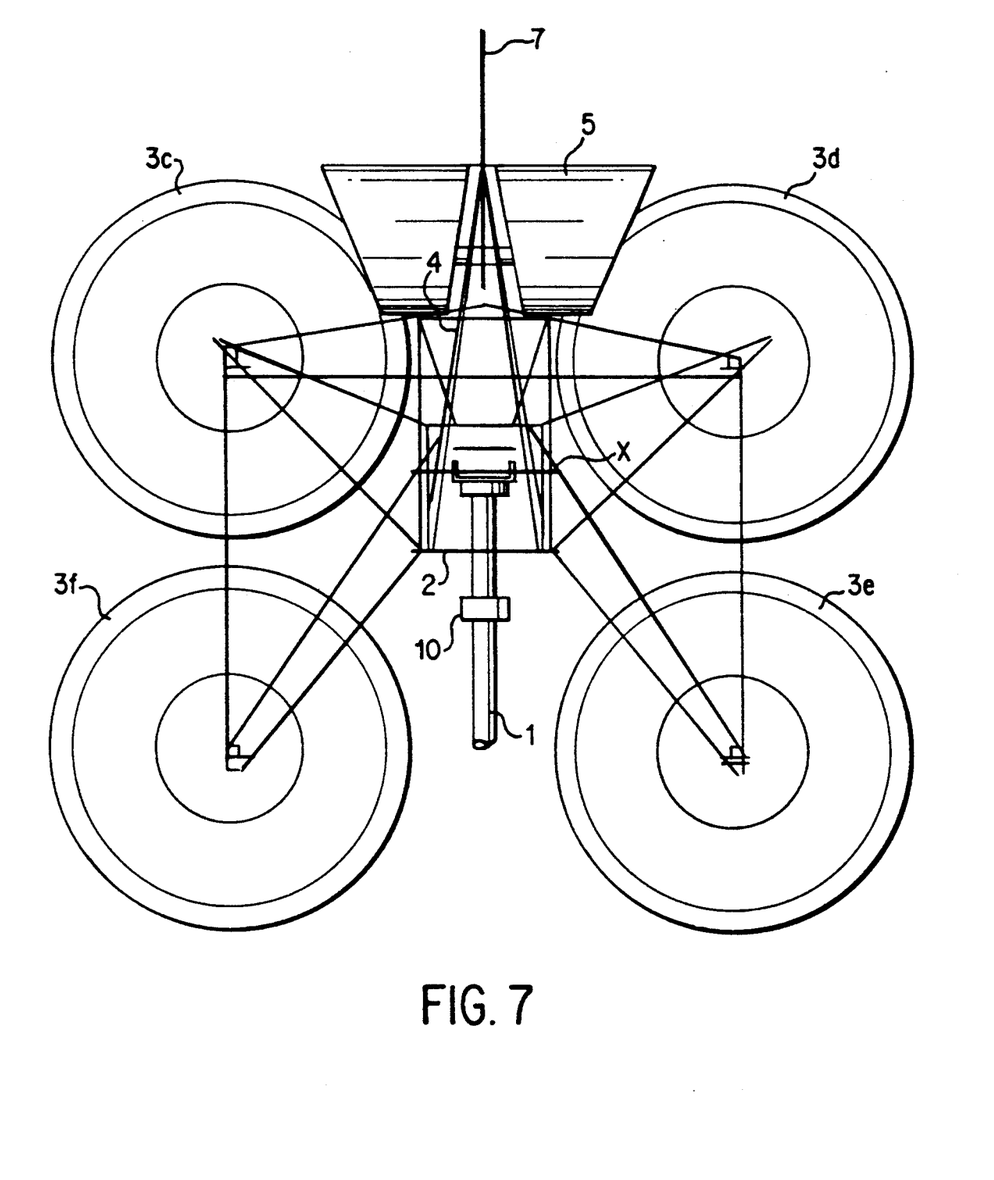
FIG. 7 is a rear view according to FIG. 6.

To increase the descending force and to stabilize the movement of the rotor bearing body, control wings 5 are preferably provided at both sides of end section 4 of the bearing body, so that these are adapted to be pivoted in pairs on the upper portion of end section 4 of bearing body 2 (see also FIG. 7).

A sensor-type position detecting device (not shown) is preferably provided in connection with the selection of the adjustment angle of control wing 5 on end section 4 of bearing body 2.

FIGS. 4 and 5 illustrate another embodiment of the present invention. The rotor assembly which consists of two rotor pairs 3 of which each is formed by two coaxial contra-rotating rotors 3a and 3b, and of which only one rotor pair is shown in FIGS. 4 and 5, is laterally mounted on bearing body 2 via a frame structure 13.

Such an arrangement has the advantage that the wind can flow in an unhindered way onto control wing 5, which is not under the lee of rotor assembly 3, so that the efficiency of control wing assembly 5 is high and a corresponding compensation torque is produced due to the descending force A created by the control wing.

Figure 6:
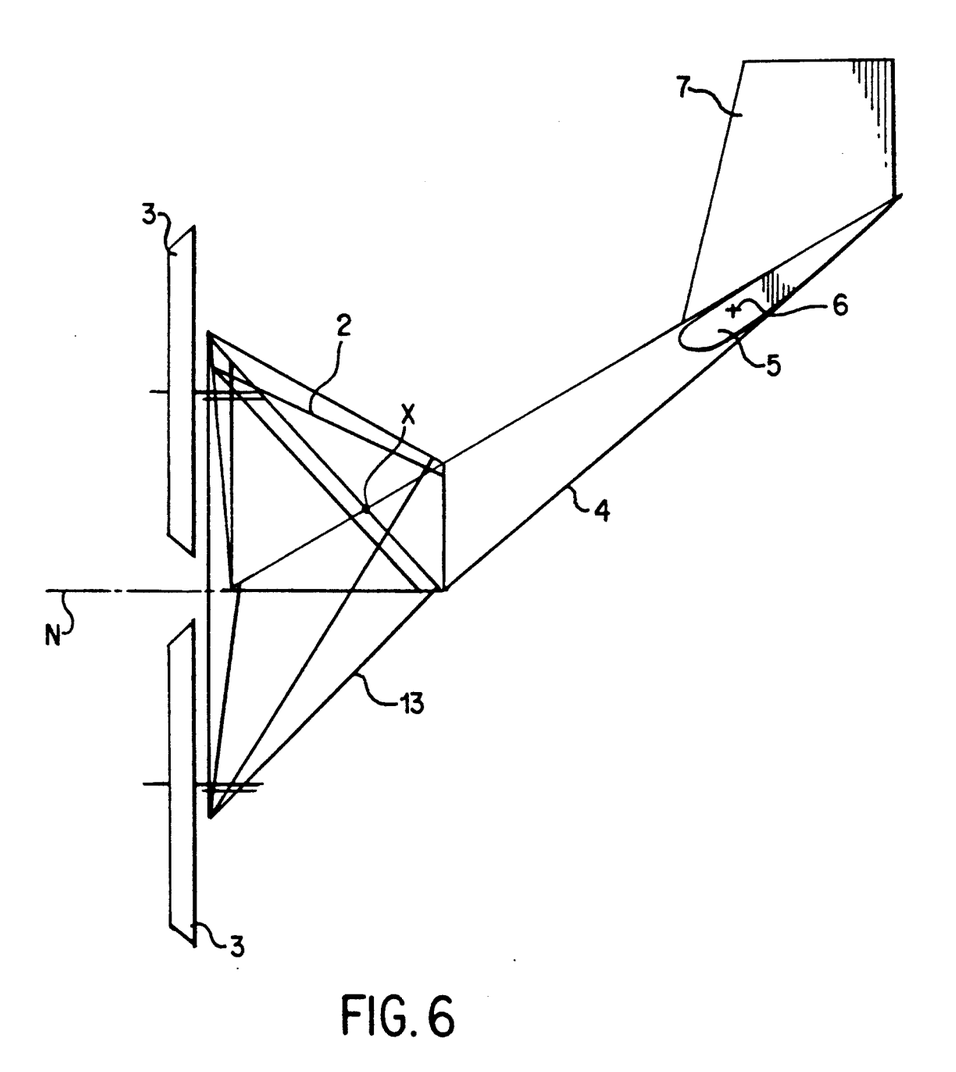
FIG. 6 shows a rotor bearing assembly similar to that shown in FIG. 1, in accordance with another embodiment of the present invention and with four rotors.

FIGS. 6 and 7 illustrate another embodiment of the present invention. On a frame structure 13, which is part of bearing body 2, four rotors 3c–3f of opposite twist are arranged on rotor assembly 3 for increasing the efficiency of the wind power engine It is also possible that each rotor 3c–3f, in turn, consists of two contra-rotating rotors which are mounted coaxially in rotatable fashion. In this embodiment, too, the whole rotor bearing assembly is suspended, together with bearing body 2 and the downstream control wing assembly consisting of a pair of control wings 5, in such a way that a horizontal center axis N of rotor assembly 3 extends below and substantially at right angles relative to the horizontal pivot axis X through which the center-of-gravity axis of the rotor bearing assembly extends at the same time. A control flag 7 supports the permanent wind orientation of the rotor assembly by supporting the pivotal movement of bearing body 2 about the vertical axis 9 in adaptation to changes in the wind direction. For reasons of simplicity, tower 1 is not illustrated in FIG. 6, and FIG. 7 is a rear view of the rotor bearing assembly according to FIG. 6. In this embodiment, too, the pivotal movement about the horizontal pivot axis X may be controlled through a mechanical forced control, or by controlling the adjustment angle of control flaps 5, e.g., for influencing the speed of rotors 3c–3f.

Figures 8, 9:
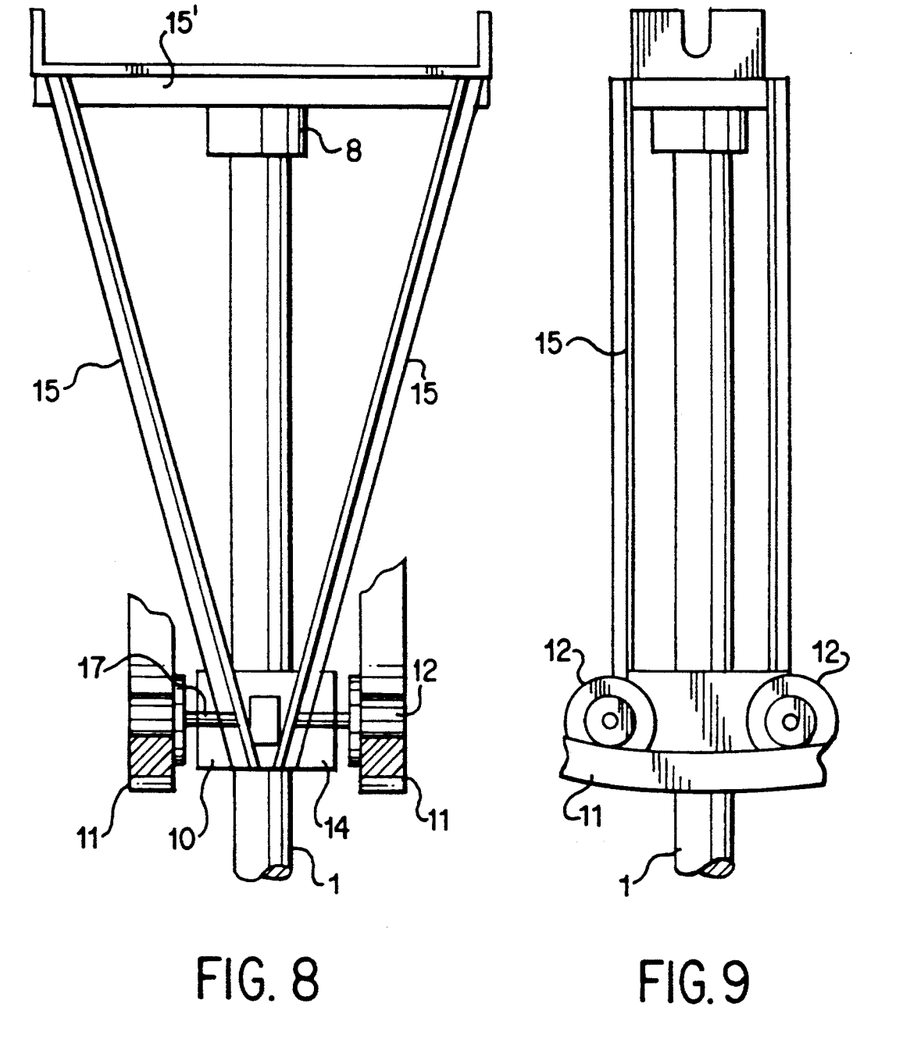
FIG. 8 is a diagrammatic front view of an auxiliary bearing assembly according to FIG. 1.
FIG. 9 is a side view according to FIG. 8.

An auxiliary bearing assembly shall now be explained in conjunction with FIG. 1 and with reference to FIGS. 8 and 9. This assembly is shown on an enlarged scale and diagrammatically in detail and serves to relieve the main bearing 8 for the yaw mounting of the rotor bearing assembly about the vertical axis through a vertical auxiliary bearing 10 and serves, in addition, to receive lateral tilting moments Moreover, it forms a main or auxiliary bearing or support bearing for the bearing establishing the horizontal pivot axis X and an additional support for bearing body 2 during pivotal movement about the horizontal pivot axis X.

As is already outlined diagrammatically in FIG. 1, the vertical auxiliary bearing 10 is provided below main bearing 8 in addition to said main bearing 8 for the rotation of the bearing assembly about the vertical axis 9. Housing 14 of this auxiliary bearing is connected through a two-armed frame structure formed by vertical struts 15 to the other main part of bearing body 2 via a support 15'. Cylindrical rollers 12 are supported either directly on tower 1 or on a guide path thereof within the vertical auxiliary bearing 10 in a way which is not shown in more detail. A two-point bearing consisting of main bearing 8 and vertical auxiliary bearing 10, which members are connected by a lever, is thereby obtained also with respect to laterally occurring tilting loads, so that an increased stability of the rotor bearing assembly is obtained with respect to tilting moments acting substantially vertically relative to the longitudinal axis of bearing body 2 with end section 4.

. Moreover, a twin-type guide-rail assembly consisting of circular arcuate guide rails 11 extending at both sides of the tower may be connected in an advantageous way to housing 14 of the vertical auxiliary bearing 10. These rails are in engagement with a cylindrical roller assembly 12 which is supported on the main bearing via vertical struts 15 and a bearing support 15'. The center of curvature of guide rails 11 is located on the horizontal pivot axis X. A pivotal movement about the horizontal pivot axis X can thus be achieved in a reliable way. At the same time, buffer or stop means may be provided in this area or in the area of tower 1 for defining a pivotal movement of bearing body 2 together with rotor assembly 3 about the horizontal pivot axis X. The stability of the bearing assembly is simultaneously increased thereby with respect to lateral tilting movements without additional bending loads acting on the tower. The guide rollers 12 are arranged in pairs and are preferably received on the transverse shafts 17 mounted on housing 14 of the vertical auxiliary bearing.

In an alternative embodiment of the rotor bearing assembly of the invention (not shown in the drawings), the vertical auxiliary bearing 10 may also be configured as a slide assembly comprising a slide surface or curved slide rail which is connected to bearing body 2 and whose curvature follows, at least in part, a radius of curvature with the horizontal pivot axis X as the place of the center of curvature. At least one stationary slide shoe is in sliding contact with the slide surface and connected to main bearing 2. In this case, too, the slide surface or slide rail as well as the associated slide shoe are preferably provided in pairs at both sides of the vertical support device 1, and a pair of spaced-apart slide shoes are respectively in sliding contact with each slide surface. These are preferably made of a material having self-lubricating properties.

Figure 10:
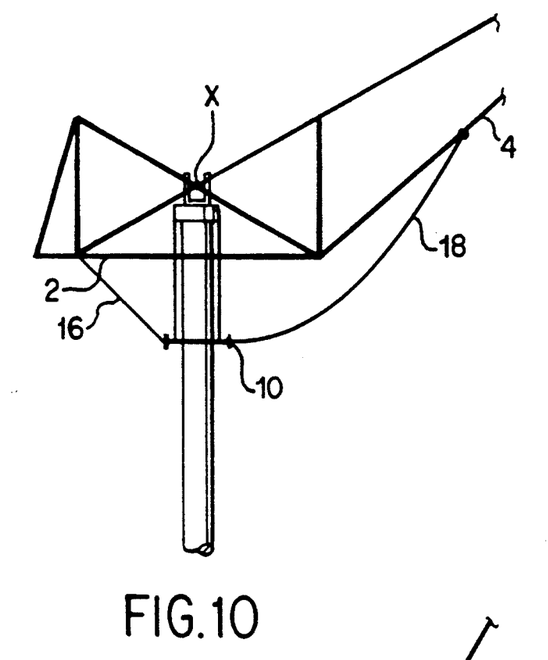
FIG. 10 is a diagrammatic view of a pivotal-movement limiting device in conjunction with a rotor bearing assembly according to FIG. 1.
Figure 11:
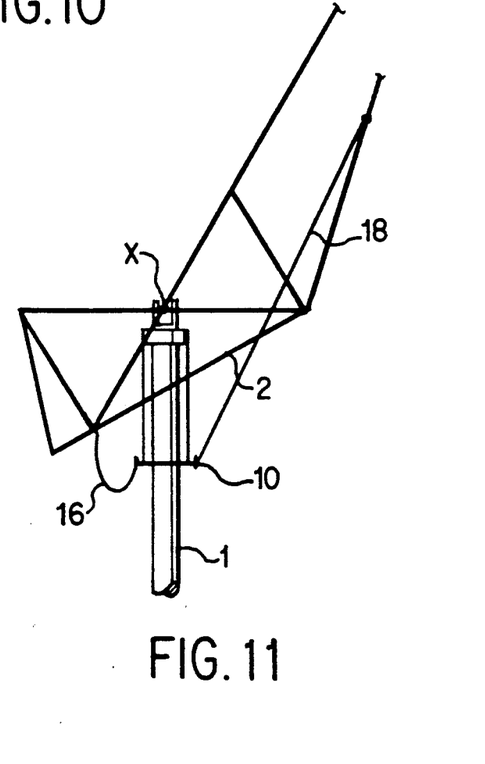
FIG. 11 shows, like FIG. 10, a pivoted state of the bearing body in a pivot limiting position.

Another embodiment of the subject matter of the invention is diagrammatically illustrated in FIGS. 10 and 11, which substantially correspond to FIGS. 2 and 3. Bearing body 2 is just shown with the vertical auxiliary bearing 10 and the extended end section 4 in a diagrammatic way without the rotor assembly and control wing assembly. To limit the pivotal movement of bearing body 2 about the horizontal pivot axis X, a tension means consisting of flexible cables or plastic ropes 16, 18 is provided for each of the lever arms of bearing body 2. The plastic rope assembly 16 extends between the housing of the vertical auxiliary bearing 10 on the one hand and a coupling point of bearing body 2 provided in the vicinity of the rotor on the other hand. The second plastic rope assembly 18 extends in connection with the other lever arm of bearing body 2 between the housing of the vertical auxiliary bearing 10 and a coupling point on the end section 4 of bearing body 2, said coupling point being provided approximately in a plane containing a horizontal extension of the upper end of a central part of bearing body 2. The effective rope length of the first flexible plastic rope assembly 16 is preferably chosen such that a horizontal position of bearing body 2 forms an end position of the rotor bearing assembly, as illustrated in FIG. 10, whilst the effective rope length of the second plastic rope assembly 18 determines a maximum inclination or pivot angle about the horizontal axis X.

Although this is not shown, the ends of the plastic rope assemblies 16, 18 are preferably mounted on housing 14 of the vertical auxiliary bearing 10 via rotatable reels, so that a corresponding forced control and pivotal movement of the bearing body about the horizontal axis X can be performed, preferably in a remote-controlled way, by driving servo motors which are assigned to said reels and also secured to housing 14. The system can thus be prepared in an advantageous way for maintenance work, or the occurrence of dangerous wind forces can be taken into account through a corresponding inclination of the bearing body.

In summary, the invention is especially distinguished by the features that it reduces flexural stresses on the tower of the wind power engine to a considerable degree and thus reduces stresses on the foundation, for, in addition to a bending moment caused by the wind force, a compensating bending moment is produced in the opposite direction by a control wing device which is arranged at the tail end of the bearing body and whose profile produces a corresponding downward force. Moreover, the suspended mounting of the bearing body of the rotor assembly on the tower effects a stable balanced mounting, with the weights being substantially carried by the tower itself in a normal operative position of the rotor assembly. Moreover, the vertical support device or tower of the wind power engine can be of a lightweight and mass-reduced construction owing to the decreased stresses. As a result, the costs for such wind power engines can be reduced considerably. At the same time, the control of the speed of the rotor assembly, on the one hand, by influencing the adjustment angle of control wings 5 and, on the other hand, by tilting bearing body 2 of rotor assembly 3 arbitrarily about the horizontal pivot and bearing axis, results in an extremely advantageous control system for the speed control of the rotors. At the same time, it is possible through the rotor bearing device of the invention to achieve a reliable adjustment of the rotor assembly in the wind with the aid of control flags or wings at the rear end of the bearing body, so that maximum efficiency of the system is ensured.

The electric generator means which exist of course and are used for converting the wind energy received by the rotor assembly 3 into electrical energy have not been discussed in more detail in the above description. It is of course obvious to one skilled in the art that these means for producing electrical energy are provided in a conventional way within rotor assembly 3 and are, e.g., intended for controlling the adjustment angle of the control wing, if this is desired, or for supplying energy to the servo motors which are provided together with the winding reels of the plastic rope assemblies 19. The dimensions of the rotor bearing assembly, in particular the selection of the lever ratios and the size of the control wings for generating corresponding downward forces so as to reduce the bending moments on tower 1 can be chosen within a wide range in response to the respective demands.

We claim:

1. A rotor bearing assembly for a wind power engine comprising: a rotor assembly; at least one pair of contra-rotating rotors on a multiaxially movable bearing body which includes a positioning device and which is mounted on at least one stationary support device, said rotor assembly being arranged at one side of a horizontal pivot axis, wherein said bearing body is supported above its center of gravity on said support device to pivot about said horizontal pivot axis, said horizontal pivot axis extends above a horizontal center axis of said rotor assembly, and at another side of said horizontal pivot axis said bearing body comprises an extended end section with at least one aerodynamic control wing which is pivotably mounted on said end section and which produces a downward force when air flows over said control wing.

2. A rotor bearing assembly according to claim 1, wherein said bearing body includes a rotor support section at one side of said horizontal pivot axis and a control-wing support section at another side of said pivot axis, the distance between a bearing of said rotor assembly and said pivot axis being smaller than the distance between a bearing of said control wing and said pivot axis.

3. A rotor bearing assembly according to claim 1, wherein said control wing has an aerodynamic airfoil profile.

4. A rotor bearing assembly according to claim 3, wherein a curvature of a bottom side of said airfoil profile of said control wing is greater than a curvature on a top side thereof.

5. A rotor bearing assembly according to claim 1, wherein a pair of control wings are provided on the top end of said end section.

6. A rotor bearing assembly according to claim 1, wherein said end section has at least one of a control flap, a control wing, and a control surface.

7. A rotor bearing assembly according to claim 1, wherein with respect to a horizontal position of said bearing body, the extended end section thereof forms a control-wing support section extending obliquely upwards, a pivot bearing of said control wing being provided on said end section approximately in an imaginary axial extension of the rotor periphery.

8. A rotor bearing assembly according to claim 1, wherein said rotors are coaxially arranged on said bearing body.

9. A rotor bearing assembly according to claim 1, wherein said rotors are arranged side by side on said bearing body.

10. A rotor bearing assembly according to claim 1, wherein four contra-rotating rotors are arranged on said bearing body via a frame structure.

11. A rotor bearing assembly for a wind power engine comprising: a rotor assembly; at least one pair of contra-rotating rotors on a multiaxially movable bearing body which includes a positioning device and which is mounted on at least one stationary support device, said rotor assembly being arranged at one side of a horizontal pivot axis wherein said bearing body is supported above its center of gravity on said support device to pivot about said horizontal pivot axis, said horizontal pivot axis extends above a horizontal center axis of said rotor assembly, and at another side of said horizontal pivot axis, said bearing body comprises an extended end section with at least one aerodynamic control wing which is pivotably mounted on said end section and which produces a downward force when air flows over said control wing; and a vertical auxiliary bearing for receiving tilting moments of said bearing body in connection with a rotatable mounting of said bearing body about a vertical axis on said stationary support device.

12. A rotor bearing assembly according to claim 11, further comprising a main bearing which supports said bearing body on said vertical support device for rotation about said vertical axis, and wherein said vertical auxiliary bearing is formed below said main bearing and in communication therewith.

13. A rotor bearing assembly according to claim 12, wherein said vertical auxiliary bearing comprises a cylindrical roller assembly and a housing, said cylindrical roller assembly being in engagement with a stationary guide path of said vertical support device.

14. A rotor bearing assembly according to claim 13, wherein said housing of said vertical auxiliary bearing is connected to said main bearing by a two-armed frame structure.

15. A rotor bearing assembly according to claim 13, further comprising a support bearing which includes a guide-rail/guide-roller assembly and which is formed between said bearing body and said housing of said vertical auxiliary bearing.

16. A rotor bearing assembly according to claim 15, further comprising two parallel guide rail sections of circular arcuate shape which are provided on said bearing body, said guide rail sections extending within the area of said housing of said vertical auxiliary bearing along said rotor support section and said control-wing support section at both sides of said vertical support device centrically with respect to said horizontal pivot axis of said bearing body, and further comprising guide rollers provided at both sides of said housing of said vertical auxiliary bearing for engagement with said guide rail sections.

17. A rotor bearing assembly according to claim 16, wherein said guide rollers are arranged on transverse shafts of said housing.

18. A rotor bearing assembly according to claim 1, further comprising first and second tension means, located at both sides of said horizontal pivot axis, for limiting a pivotal movement of said bearing body about said horizontal pivot axis.

19. A rotor bearing assembly according to claim 18 wherein said first tension means is provided between said housing of said vertical bearing and a coupling point spaced apart from said pivot axis at the rotor side on said rotor support section of said bearing body, and said second tension means is provided between said housing of said vertical auxiliary bearing and a coupling point of said end section of said bearing body, which coupling point is spaced apart from said pivot axis at the control wing side.

20. A rotor bearing assembly according to claim 19, wherein said tension means comprise tension proof ropes which are received on said housing of said vertical auxiliary bearing.

21. An apparatus comprising:
(a) a stationary support device;
(b) a rotor assembly;
(c) a bearing body which is pivotally mounted on said support device about a first pivot axis, said bearing body having a first end section on which said rotor assembly is mounted and having a second end section; and
(d) an aerodynamic control wing which is pivotally mounted on said second end section about a second pivot axis and which produces a downward force on said second end section when air flows over said control wing.

22. An apparatus as defined in claim 21, wherein said first and second pivot axes are horizontal axes, and wherein said first pivot axis extends above a central axis of said rotor assembly and said second pivot axis extends above said first pivot axis.

23. An apparatus as defined in claim 21, wherein said control wing has an aerodynamic airfoil profile having an upper surface of a relatively low curvature and a lower surface of relatively high curvature.

* * * * *